United States Patent [19]

Martinie

[11] Patent Number: 5,153,990
[45] Date of Patent: Oct. 13, 1992

[54] METHOD FOR MOUNTING A BEARING OR OTHER DEVICE AND TAPERED ADAPTER ONTO A SHAFT

[75] Inventor: Howard M. Martinie, Simpsonville, S.C.

[73] Assignee: Reliance Electric Industrial Company, Greenville, S.C.

[21] Appl. No.: 637,478

[22] Filed: Jan. 4, 1991

Related U.S. Application Data

[62] Division of Ser. No. 491,300, Mar. 9, 1990, Pat. No. 5,011,306.

[51] Int. Cl.⁵ .............................. F16C 27/04
[52] U.S. Cl. .............. 29/898.07; 29/898.09; 29/450
[58] Field of Search ............ 29/898.07, 898.09, 892.1, 29/450, 464, 466, 468, 129, 117; 384/585, 538, 272, 584, 540, 581; 403/365, 367, 368, 370

[56] References Cited

U.S. PATENT DOCUMENTS

| | | | |
|---|---|---|---|
| 1,708,981 | 4/1929 | Vickers | 384/273 |
| 2,043,272 | 6/1936 | Wallgren | 403/370 X |
| 3,325,175 | 6/1967 | Lower | 277/171 |
| 3,497,274 | 2/1970 | Yardley | 384/583 |
| 3,807,820 | 4/1974 | Schuhmann | 384/538 |
| 3,816,013 | 6/1974 | Schuhmann | 384/538 X |
| 4,304,502 | 12/1981 | Stratienko | 403/370 |
| 4,316,678 | 2/1982 | F' Geppert | 403/370 X |
| 4,598,443 | 7/1986 | Ostling et al. | 403/370 X |
| 4,741,631 | 5/1988 | Terkovich | 384/273 |
| 4,893,948 | 1/1990 | Hoch | 384/568 X |

FOREIGN PATENT DOCUMENTS

| | | | |
|---|---|---|---|
| 3835894 | 8/1989 | Fed. Rep. of Germany | 403/370 |
| 1346363 | 2/1974 | United Kingdom | 403/370 |

Primary Examiner—Joseph M. Gorski
Assistant Examiner—S. Thomas Hughes
Attorney, Agent, or Firm—Dority & Manning

[57] ABSTRACT

An assembly and method is provided for properly securing a device such as a bearing, pulley, sheave or the like to a shaft wherein a split tapered adapter is received about the shaft, the adapter having a first end of lesser diameter, a second end of greater diameter, and a tapered surface therebetween, and threads defined about the first end of the adapter, a locknut is in threaded engagement with the first end of the adapter and a device received about the adapter. The locknut has a set of set screws carried therethrough and spaced therearound which are controlled such that the force developed thereby is adequate to clamp the adapter to the shaft and seat the device on the adapter yet is inadequate to move the device toward the second end of the adatper. A second plurality of set screws may be received through said locknut which generate adequate force to move the device up the adapter to achieve a predetermined location of the device. Alternately, the locknut may be turned a predetermined member of degrees of rotation to force the device up the adapter by a predetermined amount.

12 Claims, 3 Drawing Sheets

METHOD FOR MOUNTING A BEARING OR OTHER DEVICE AND TAPERED ADAPTER ONTO A SHAFT

This is a division, of application Ser. No. 07/491,300, filed Mar. 9, 1990, now U.S. Pat. No. 5,011,306.

BACKGROUND OF THE INVENTION

The present invention relates to the use of tapered adapters for fitting bearings, pulleys, sheaves and the like to shafts and more particularly to an improved method and apparatus for properly seating an adapter and a device to a shaft and to moving the device up the adapter to acquire a proper location of the device on the adapter. While other devices are contemplated, the specification is specifically directed to bearing installation only.

It is well known in the art to employ split tapered adapters to properly secure bearings to shafts. Generally, a nut is provided to first seat the bearing and adapter with a plurality of screws to urge the tapered surfaces of the adapter and the inner race of the bearing together thereby properly positioning the two and causing the adapter to contract and grip the surface of the shaft. It is thus well known to use set screws in the locknut to assist in moving the bearing up the adapter. Examples of such assemblies are found in U.S. Pat. No. 3,325,175 to Lower, U.S. Pat. No. 3,497,274 to Yardley and *Dodge Engineering Catalog*, Vol. 1, pp. B4-24, 25 (Adapter Mounted SAF-SAFS-SDAF Spherical Roller Bearings).

In order, however, to properly secure the bearing by such method it is necessary to first properly seat the adapter to the shaft and the bearing to the adapter. Then the bearing is "snugged up" to the adapter, expanding the inner race of the bearing and providing a tight fit with a holding power approximating that of a conventional press or interference fit. However, it is difficult for an installer to accurately judge whether or not the elements are all properly seated, and that the bearing expansion is correct. If the installer's judgment is wrong, the amount of expansion of the inner race will not be proper which can lead to a loose bearing fit or excessive expansion, both of which will ultimately lead to bearing failure.

The apparatus and method according to the present invention remove the need for a judgment on the part of an installer and permit consistent known accuracy in installation to achieve both a proper seat and a proper bearing expansion, or location of another device. No known prior art is believed to teach or suggest the present invention.

SUMMARY OF THE INVENTION

The present invention recognizes and addresses the foregoing disadvantages, and others, of prior art bearing assemblies.

Accordingly, it is an object of the present invention to provide a bearing assembly which removes the need for judgment on the part of the installer in installing the assembly.

It is another object of the present invention to provide an improved adapter assembly for proper seating of the adapter and a bearing, pulley, sheave or the like on a shaft.

It is a further object of the present invention to provide a means for properly securing a bearing to a shaft with a tapered adapter and properly expanding the bearing.

Yet another object of the present invention is to provide a method for installing a bearing on a shaft using a tapered adapter without requiring judgment as to the point at which all elements are properly seated and ready for tightening.

It is still another object of the present invention to provide an improved locknut for use with a tapered adapter for securement of a bearing, pulley, sheave or the like to a shaft.

It is still a further object of the present invention to provide a method for securing a bearing about a tapered adapter and clamping the adapter to a shaft while properly expanding the bearing about the adapter.

These as well as other objects are achieved by the steps of locating a tapered adapter about a shaft, the adapter having a first end of lesser outer diameter, a second end of greater outer diameter, a tapered surface between the two ends, threads defined about the first end, and said adapter defining a split through its length; loosely fitting a bearing or other device to be mounted about the adapter, threading a locknut onto the first end of the adapter to abut the bearing or other device with the locknut having a set of set screws spaced circumferentially thereabout and generally parallel to said shaft, the set screws being controlled such that the force developed thereby is adequate only to clamp the adapter to the shaft and seat the bearing or other device on the adapter, while being inadequate to move the bearing or other device toward the second, large end of the adapter; tightening the set screws to clamp the adapter to the shaft and seat the bearing or other device and adapter on the shaft; moving the bearing or other device a known, predetermined distance up the tapered surface toward the second end of the adapter to achieve a known positioning of same and securing the bearing or device in place.

In a most preferred embodiment, the locknut has two sets of set screws or other threaded elements therearound. A first, set is sized to only seat the bearing and adapter on the shaft, generally up to a maximum point short of where the longitudinal split in the adapter becomes closed. A second set of set screws or other threaded elements is located around the circumference of the locknut, interspaced with the first set of set screws, and the set screws are sized to develop adequate force against the bearing or device to force same up the taper or incline of the adapter and thus position the bearing or device as desired.

With a known distance of bearing movement, for example, achieving a known expansion for a particular bearing, the distance between the face of the locknut and the bearing can be measured. The second set of set screws may then be employed to force the bearing onto the adapter by a measured, known amount to achieve proper expansion of the bearing. After proper movement of the bearing by the second set screws, the set screws can be backed out and the locknut threadably moved into contact with the bearing to lock the assembly in place.

In other embodiments, different means can be employed in the step of movement of the bearing, for example, once the bearing and adapter have become known to be seated onto the shaft. For example, once seated, the smaller, seating set screws can be moved out of contact with the bearing. Thereafter, using a known degree of rotational turn of the locknut to impart a known amount of bearing movement, the locknut can be brought into contact with the bearing and then turned a predetermined number of degrees to achieve proper expansion of the bearing. Once, of course, the desired movement and attendant expansion have been realized by turning of the locknut, the assembly is automatically locked by the locknut.

The bearing assembly according to the present invention comprises a bearing for receipt on a tapered adapter, said bearing including an inner race defining a central bore through said bearing, an outer race and a plurality of bearing elements located between said inner and outer races; a split tapered adapter, said adapter defining a bore therethrough for receipt of a shaft therein, said adapter having threads therearound for a portion of the length of same; and a locknut received around said adapter at said threaded portion and in threaded connection therewith, said locknut defining a plurality of threaded openings therearound generally parallel to said bore through said adapter, and threaded elements in threaded connection with said threaded openings in said locknut, said elements being of a size to move said bearing onto said adapter only for seating said bearing and said adapter on a shaft while being inadequate in size to further move said bearing onto said adapter for expansion of said bearing.

More specifically, the threaded elements located on said locknut for seating said bearing and said adapter tightly about said shaft are preferably small set screws, but in any event collectively develop inadequate force to move the bearing onto said adapter further than required to close the split adequate to seat the adapter on the shaft. Hence, full use of the small set screws terminates at initial seating of the bearing and adapter on the shaft.

Consequently, one installing a bearing assembly according to the present invention need not make any judgment as to whether the bearing and adapter are tightly seated on the shaft. Such point is reached at the end of movement of the bearing by the set screws.

In a further form, the present invention includes a tapered adapter assembly for the mounting of a bearing on a shaft, said assembly comprising an annular split element, said element defining a bore therethrough of common diameter, said element having an outer surface that tapers from a first diameter section upwardly to a second, larger diameter section for receipt within a bore defined by a bearing or other device to be mounted, said bore having a reverse taper to the outer surface of said annular split element, said first diameter section of said element defining threads therearound; and a locknut received around said first diameter section in threaded engagement therewith, said locknut defining a plurality of threaded openings located therearound, said threaded openings being generally parallel to a shaft about which said adapter assembly is to be mounted; and members received in threaded connection with said plurality of openings, said threaded members being capable collectively of generating a force when threadedly moved against a bearing or device received about said adapter adequate only to seat said bearing or device and said adapter on said shaft while being inadequate to move said bearing up said tapered surface of said adapter. In a preferred arrangement, said locknut defines a further plurality of larger openings therearound with larger threaded members therein which will generate force adequate to move said bearing or other device up said tapered surface of said adapter.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures in which:

FIG. 6-A is a cross-sectional view of a portion of the locknut of FIG. 6 as taken along a line 6—6, and illustrating a further embodiment of same.

Figure 1:
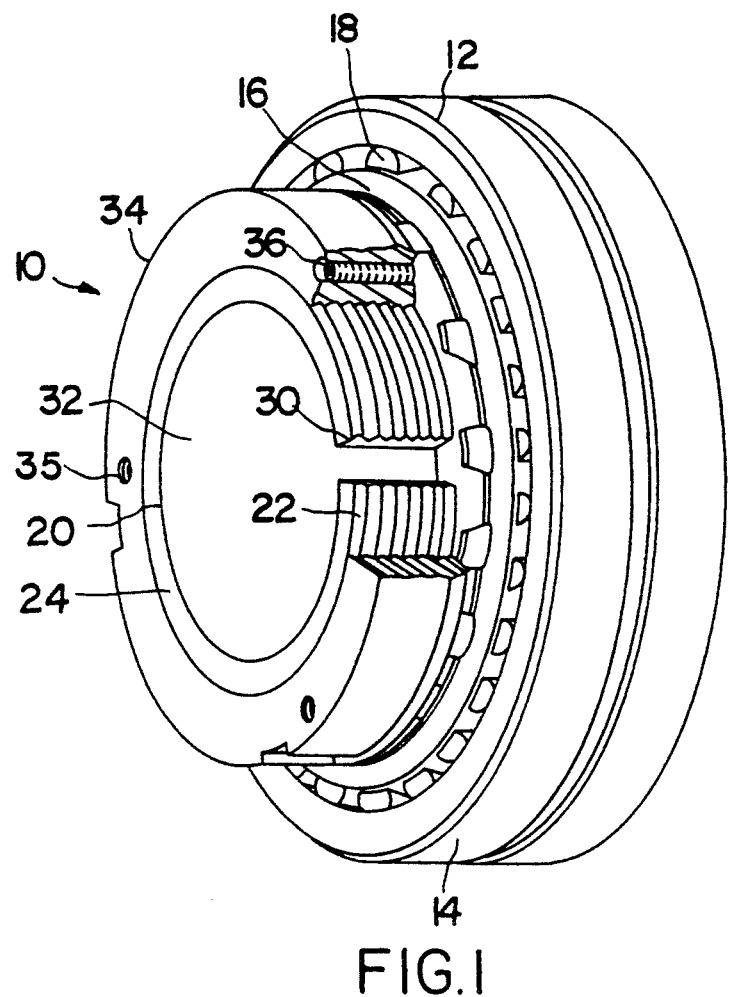
FIG. 1 is a perspective view assembly in accordance with the present invention.

Repeat use of reference characters in the present specification and drawings is intended to represent same or analogous features or elements of the invention.

DETAILED DESCRIPTION OF A PREFERRED EMBODIMENT

Making reference to the Figures, preferred embodiments of the present invention will be described in detail. In FIG. 1, a bearing assembly generally 10 is illustrated in accordance with the present invention.

Bearing assembly 10 includes a bearing unit 12, a tapered adapter 20 and a locknut 34 which are employed to mount an assembly on a shaft (not shown). Bearing 12 is a spherical roller bearing which has an outer race 14, an inner race 16 and a plurality of roller bearings 18. Tapered adapter 20 is shown with threads 22 disposed about an end 24 thereof of a first, small diameter. As better shown in FIGS. 2-5, tapered adapter 20 has one end 24 of a small or lesser diameter and an opposite end 126 of greater diameter with an exterior tapered surface 128 extending therebetween. Generally, inner race 16 of bearing 12 is received on tapered surface 28 of adapter 20 and has a complementary inner surface (see FIGS. 2-5). Adapter 20 defines a split 30 therethrough which extends along the length thereof. Split 30 allows adapter 20 to be freely moved onto a shaft carried through an inner bore 32 of adapter 20 and be securely clamped thereon.

Locknut 34 is threadably receivable on threaded end 24 of adapter 20. In accordance with the present invention, locknut 34 defines a plurality of threaded openings 35 which receive threaded elements 36 therein, such as set screws. Openings 35 are spaced circumferentially around locknut 34. Set screws 36 are limited in size and/or number such that the force exerted thereby is sufficient to clamp adapter 20 to a shaft carried in inner bore 32 up to a maximum point just before split 30 becomes closed about the shaft. The force developed by set screws 36 is, however, inadequate to move bearing 12 up tapered surface 28 of adapter 20, as will be discussed further below.

With the bearing assembly 10 described above, the adapter 20 and bearing 12 may be placed onto a shaft, located as desired and secured to the shaft by turning set screws 36 to cause adapter split 30 to close adequately for adapter 20 to securely grip the shaft. One using this technique will thus know when assembly 10 is secured or seated to shaft 10. Thereafter bearing 12 can be forcably moved up tapered surface 28 of adapter 12 by a predetermined amount to achieve a known, and correct expansion of bearing 12 (of inner race 16). FIGS. 2-5 schematically illustrate a technique for the overall mounting technique which consistently yields a correct bearing mounting.

Figure 2:
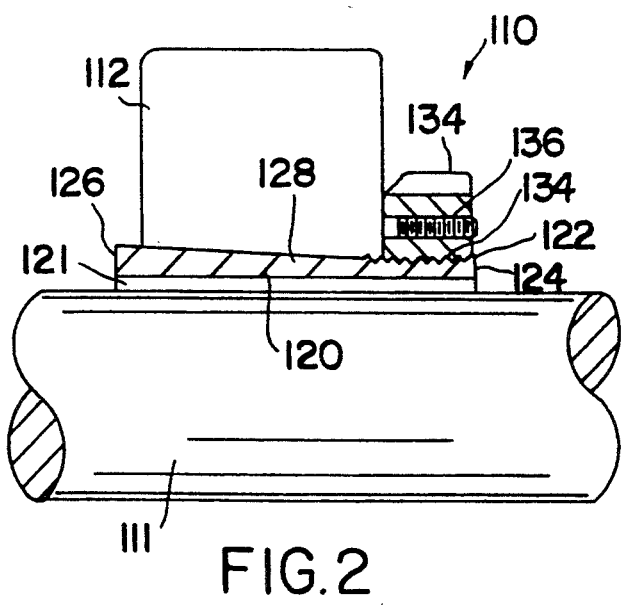
FIG. 2 is a partial vertical cross-sectional schematic view of a bearing assembly according to the present invention as loosely received about a shaft.
Figure 3:
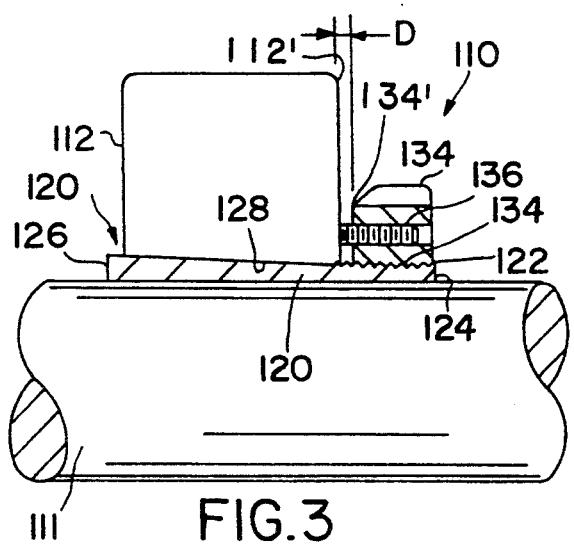
FIG. 3 is a partial vertical cross-sectional schematic view of a bearing assembly as illustrated in FIG. 2 with all elements seated on the shaft.

Referring now to FIGS. 2 and 3, a bearing assembly generally 110 is shown loosely mounted "finger tight" about a shaft 111. Thus, in accordance with the present invention, a tapered adapter generally 120 having a first end 124 and a second end 126 with threads 122 defined about the first end has been located loosely about shaft 111. Clearance space 121 is illustrated in FIG. 2 to represent that the adapter is not yet tightly clamped to the shaft. Bearing 112 is loosely fit about a lower end of adapter 120 and locknut 134 having set screws 136 is threadedly received on first end 124 of adapter 120. It is to be understood that there may be any number of screws 136 so long as they are controlled in size and/or number such that the force developed thereby is adequate to clamp adapter 120 to shaft 111 and to seat bearing 112 on the adapter yet is inadequate to move the bearing toward the second, larger end 126 of the adapter. FIG. 3 illustrates the proper seating of the elements as attained by the force exerted by set screws 136. Note that the clearance space 121 of FIG. 2 has been taken up.

After the elements have been properly seated, bearing 112 is to be forced a predetermined distance up the tapered surface 128 toward second end 126 of adapter 120 for proper mounting to the shaft, after which assembly 110 is secured in place.

Figure 4:
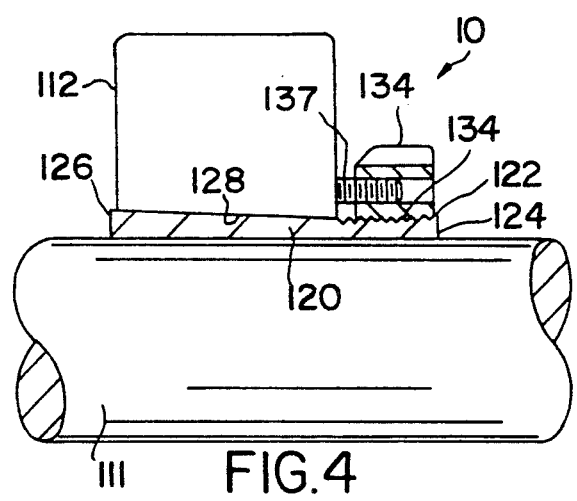
FIG. 4 is partial vertical cross-sectional schematic view of a bearing assembly as illustrated in FIG. 2 showing a preferred technique for moving the bearing up the tapered adapter.
Figure 5:
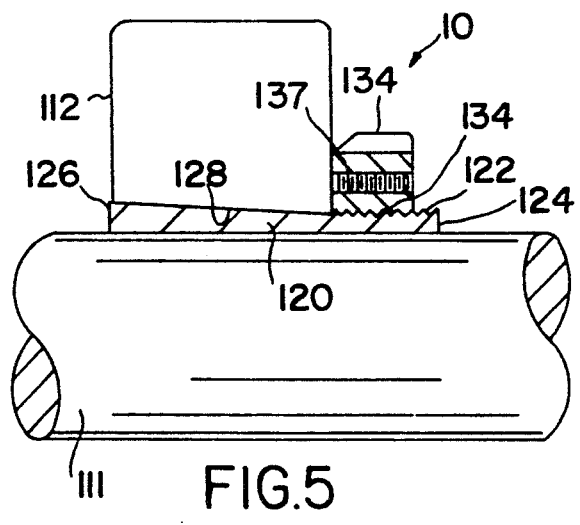
FIG. 5 is a partial vertical cross-sectional schematic view of a bearing assembly as illustrated in FIG. 4 with the bearing moved up the adapter and locked in place.
Figure 6:
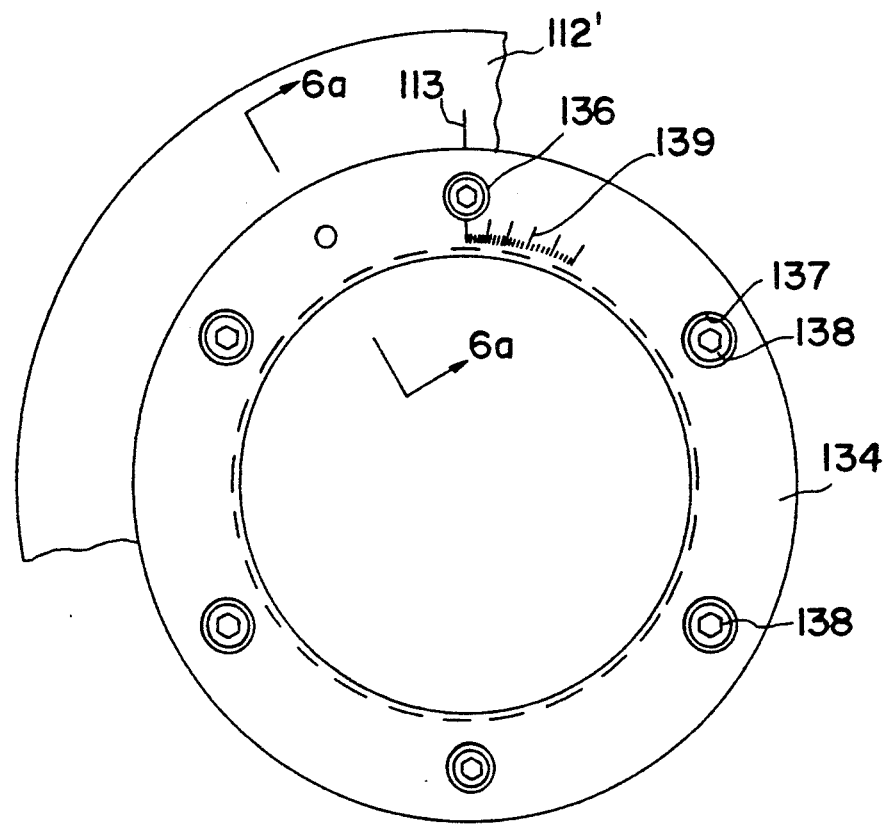
FIG. 6 is a partial end view of an adapter assembly according to the present invention illustrating a preferred embodiment.
Figure 6A:
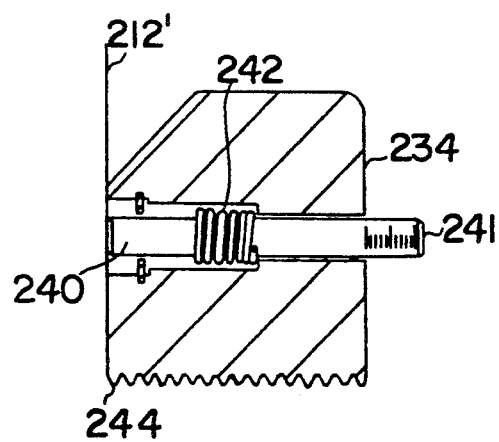

Referring to FIG. 4 and FIG. 6, a preferred apparatus is illustrated which includes means for specific movement of bearing 112 up tapered surface 128 of adapter 120. Locknut 134 is shown in end view in FIG. 6 and includes small set screws or other threaded members 136 as discussed above. Also around the circumference of locknut 134 a plurality of larger threaded openings 137 are defined in which are received larger set screws or other threaded elements 138. Larger set screws 138 are capable of developing a force when turned to move bearing 112 up tapered surface 128 of adapter 120.

With the bearing assembly initially set by small set screws 136, one can measure the distance D between a face 134' of locknut 134 and an adjacent face 112' of bearing 112 (see FIG. 3). Knowing the proper degree of expansion for the inner ring (race) of bearing 112 that is necessary for a 2222 OK bearing, e.g. 0.002 inch, and the taper of tapered surface 128 of adapter 120, e.g. 12:1 one knows that bearing 112 should be moved up the tapered surface 0.024 inch (12×0.002). Large set screws 138 can thus be turned to achieve a movement of bearing to enlarge the dimension D by 0.024 inch to accurately expand bearing 112 by 0.002 inch. For proper movement, large set screws 138 should be turned in small increments in sequence around locknut 134.

Following movement of bearing 112 the proper distance up adapter 120, set screws 138 may be turned in an opposite direction to be moved out of the way and locknut 134 then tighteded into contact with face 112' of bearing 112 to lock assembly 110 in place.

While the various sizes of set screws to be employed may vary with the size of the bearing, the taper of the adapter, the size of the shaft and the like, the force developed by the first, and normally small set screws, should be no more than that necessary to close split 130 of adapter 120 adequate for securement of bearing 112 onto adapter 120 and adaptor 120 onto the shaft, e.g. to a point where there is no clearance between the components. By way of example, for a conventional 22234K bearing and an S34-515 adapter having a 12:1 taper, the small set screws may be ⅜ inch, while the large set screws may be 7/16 inch or larger. Determination of other sizes for other bearing-adapter assemblies should be readily determinable by one skilled in the art without undue experimentation.

In the broadest context of the method according to the present invention, all of the set screws threadedly engaged with a locknut could be the same size with only certain of the set screws being employed to seat the adapter, after which the remainder or all of the set screws could be employed to move the bearing up the adapter. Likewise, the first set of set screws could be large (though few in number) and the second set for moving the bearing could be smaller than the first and used in a large enough number to generate the required force.

A further embodiment of the present invention for moving bearing 112 up adapter 120 may be seen in FIG. 6-A. A portion of a locknut 234 is illustrated having a pin 240 received therethrough under the bias of a spring 242. With the bearing assembly 110 initially mounted on the shaft, locknut 234 is brought into contact with surface 212' of bearing 212 which would force pin 240 into locknut 134 against the bias of spring 242. Then turning large set screws 138, as bearing 212 moves up the adapter, pin 240 is moved out of locknut 234 by the bias of spring 242. Graduated indicia 244 on pin 240 can be read to determine the amount of bearing movement achieved.

In a further embodiment, when locknut 134 is in contact with bearing surface 212', pin 240 would protrude from an opposite face of locknut 134 by an amount equivalent to the desired amount of movement of bearing 212 up the adapter. Thereafter bearing 212 is moved away from locknut 134 by some means until an outer tip 241 of pin 240 returns due to the spring bias to a position flush with said opposite face of locknut 134, at which point bearing 212 will have been moved the correct, predetermined amount.

In yet a further embodiment for moving a bearing up the adapter to achieve the desired expansion of the bearing, reference is again made to FIG. 6. Indicia 139 on locknut 134 of FIG. 6 are indicative of degrees of rotation when referenced to a line 13 on bearing 112. Zero degrees is illustrated in alignment with reference line 113 on surface 112' bearing 112. Once the assembly is initially seated on the shaft, locknut 134 can be tightened into contact with bearing 112. Then locknut 134 can be turned a predetermined number of degrees to move the bearing a predetermined distance up the adapter. For example, assuming again a taper of 12:1 for the adapter and a need to expand the inner ring of the bearing by 0.002 inch. If the locknut has 12 threads per inch, the nut advances 0.0833 inch per turn of the nut. Accordingly, 0.288 turn would be required to achieve a bearing movement of 0.024 inch which equates to 103.7 degrees. Hence, by using the degree indicia 139 on locknut 134 and mark 113 on bearing surface 112', one could turn locknut 103.7 degrees and know that proper bearing expansion had been achieved. Since locknut 134 would then still be in contact with bearing 112, assembly 110 would be automatically locked on the shaft.

While a particular bearing structure-adapter assembly has been illustrated and described herein, obviously other types of bearings and tapered adapters may be employed according to the present invention. Moreover, any of the embodiments shown in any of the figures may be used with any other embodiment shown or contemplated hereby, whether in addition to other features or in lieu thereof. Also the adapter and locknut according to the present invention could be employed for mounting other devices on a shaft such as for example pulleys, sheaves, and the like.

These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to be limitative of the invention so further described in such appended claims.

What is claimed is:

1. A method for securing a device to a shaft, comprising:
   locating a tapered adapter about said shaft, said adapter having a first end of a first diameter, a second end of second larger diameter, a tapered surface therebetween and threads defined about said first end, said adapter defining a split therethrough along the length thereof;
   loosely fitting a device about said adapter;
   threading a locknut located on said first end of said adapter to abut said device, said locknut having a plurality of threaded elements carried therethrough in threaded relationship therewith and spaced circumferentially thereabout, said threaded elements being dimensioned such that upon turning same, the force developed thereby is adequate to clamp the adapter to the shaft and seat the device on the adapter while being inadequate to move the device further toward the second end of the adapter;
   turning said threaded elements to move said device up the tapered adapter a sufficient distance to seat said adapter and device to said shaft;
   thereafter moving said locknut to force said device a predetermined distance up the tapered surface of said adapter toward said second end of same; and
   securing the device in place.

2. A method set forth in claim 1 wherein the step of moving said locknut to force the device up the tapered surface of said adapter toward the second end of same is achieved by backing out said threaded elements, tightening the locknut to abut said device, and thereafter advancing the locknut a predetermined number of degrees of rotation.

3. A method is defined in claim 1 wherein said locknut has a second plurality of threaded elements in threaded connection therewith and wherein the step of moving said locknut to force said device up the tapered surface of said adapter is achieved by turning said second plurality of threaded elements against said device until said device has been moved by said predetermined distance.

4. A method as defined in claim 1 wherein after movement of said device up said adapter, said device is secured in place by moving said locknut into contact therewith.

5. A method for securing a bearing to a shaft comprising the steps of:
   locating a split tapered adapter on said shaft with a bearing received therearound, said adapter having a first end of a lesser diameter and a second end of a greater diameter and a tapered outer surface extending therebetween, at least a portion of said first end defining threads therearound and having a locknut in threaded engagement therewith, said locknut defining a plurality of threaded openings therethrough in a direction parallel to said adapter and having first threaded elements in threaded engagement therewith, said first threaded elements being capable of developing a force upon turning adequate only to seat said adapter on a shaft passing therethrough, said locknut further defining a plurality of second threaded openings therearound in a direction generally parallel to said adapter and having second threaded elements in threaded engagement therewith, said second threaded elements being capable upon turning of exerting a force adequate to move said bearing up said tapered surface of said adapter;
   tightening said locknut until said locknut engages said bearing;
   turning said first threaded elements until said adapter and said bearing are seated on said shaft;
   thereafter turning said second threaded elements adequate to move said bearing up said tapered adapter by a predetermined amount; and
   thereafter backing out said threaded elements and tightening said locking against said bearing.

6. A method of securing a bearing to a shaft as defined in claim 5 wherein said first and second threaded elements are set screws.

7. A method of securing a bearing to a shaft as defined in claim 6 wherein said second set screws are larger than said first set screws.

8. A method as defined in claim 5 wherein said second threaded elements are interspaced among said first threaded elements.

9. A method for securing a device to a shaft, comprising:
   locating a tapered adapter about said shaft, said adapter having a first end of a first diameter, a second end of second larger diameter, a tapered surface therebetween and threads defined about said first end, said adapter defining a split therethrough along the length thereof;
   loosely fitting a device about said adapter;
   threading a first means on said first end of said adapter to abut said device, said first means having a plurality of threaded elements carried therethrough in threaded relationship therewith and spaced circumferentially thereabout, said threaded elements being dimensioned such that upon turning same, the force developed thereby is adequate to clamp the adapter to the shaft and seat the device on the adapter while being inadequate to move the device further toward the second end of the adapter;

turning said threaded elements to move said device up the tapered adapter a sufficient distance to seat said adapter and device to said shaft;

thereafter moving said first means to force said device a predetermined distance up the tapered surface of said adapter toward said second end of same; and securing the device in place.

10. The method set forth in claim 9 above wherein the step of moving said first means to force the device up the tapered surface of said adapter toward the second end of same is achieved by backing out said threaded elements, tightening said first means to abut said device, and thereafter advancing said first means a predetermined number of degrees of rotation.

11. A method as defined in claim 9 wherein said first means has a second plurality of threaded elements in threaded connection therewith and wherein the step of moving said first means to force said device up the tapered surface of said adapter is achieved by turning said second plurality of threaded elements against said device until said device has been moved by said predetermined distance.

12. A method as defined in claim 9 wherein after movement of said device up said adapter, said device is secured in place by moving said first means into contact therewith.

* * * * *